(12) United States Patent
Geiger

(10) Patent No.: US 8,555,608 B2
(45) Date of Patent: Oct. 15, 2013

(54) MULCHING LAWN MOWER REAR DISCHARGE PATHWAY AND SHIELD

(76) Inventor: Carol Geiger, Street, MD (US)

( * ) Notice: Subject to any disclaimer, the term of this patent is extended or adjusted under 35 U.S.C. 154(b) by 0 days.

(21) Appl. No.: 13/529,057

(22) Filed: Jun. 21, 2012

(65) Prior Publication Data
US 2012/0324856 A1 Dec. 27, 2012

Related U.S. Application Data

(60) Provisional application No. 61/499,407, filed on Jun. 21, 2011.

(51) Int. Cl.
*A01D 67/00* (2006.01)
(52) U.S. Cl.
USPC .......................................... 56/320.2; 56/320.1
(58) Field of Classification Search
USPC .......................................... 56/6, 320.1, 320.2
See application file for complete search history.

(56) References Cited

U.S. PATENT DOCUMENTS

| | | | | | |
|---|---|---|---|---|---|
| 1,463,944 | A | * | 8/1923 | Fishleigh | 280/848 |
| 1,488,136 | A | * | 3/1924 | Simpson | 280/847 |
| 2,211,654 | A | * | 8/1940 | Heaslet | 280/847 |
| 3,217,354 | A | * | 11/1965 | May | 16/338 |
| 3,969,876 | A | * | 7/1976 | Turos | 56/202 |
| 5,117,616 | A | * | 6/1992 | McLane | 56/17.5 |
| 5,267,429 | A | | 12/1993 | Kettler | |
| 6,038,840 | A | | 3/2000 | Ishimori | |
| 6,431,305 | B1 | | 8/2002 | Ishimori | |
| 6,470,663 | B2 | | 10/2002 | Langworthy | |
| 6,474,054 | B2 | | 11/2002 | Schaedler | |
| 2004/0112027 | A1 | * | 6/2004 | Komorida et al. | 56/202 |
| 2008/0264026 | A1 | * | 10/2008 | Ishii et al. | 56/10.8 |
| 2009/0282799 | A1 | * | 11/2009 | Kure et al. | 56/320.2 |
| 2011/0131942 | A1 | * | 6/2011 | Sugio et al. | 56/320.2 |

* cited by examiner

*Primary Examiner* — Thomas B Will
*Assistant Examiner* — Mai Nguyen
(74) *Attorney, Agent, or Firm* — Daniel Boudwin

(57) ABSTRACT

Disclosed is a rear discharge lawn mower assembly having a rearwardly-directing mower deck, a plurality of cutting blades, and rear housing and clippings pathway adapted to direct clippings through the rear of the mower assembly while shrouding the rear drive elements and tires of the mower from flying debris. The rear housing comprises an enclosed volume that shrouds the axle and rear drive elements of the mower, while further providing a pair of downwardly suspended tire shields and a rear access panel for allowing access into the housing for mower maintenance purposes. The mower deck routes clippings through a rear discharge, wherein clippings and debris are then directed into a space defined by the rear housing lower surface shield and the tire shields. In this way, grass, wood chips, glass and other hardened debris is exited from the mower without damaging the tires or drive elements of the mower.

5 Claims, 3 Drawing Sheets

MULCHING LAWN MOWER REAR DISCHARGE PATHWAY AND SHIELD

CROSS REFERENCE TO RELATED APPLICATION

This application claims the benefit of U.S. Provisional Application No. 61/499,407 filed on Jun. 21, 2011, entitled "Back Hood and Shield Lawn Tractor." The patent application identified above is incorporated here by reference in its entirety to provide continuity of disclosure.

BACKGROUND OF THE INVENTION

1. Field of the Invention

The present invention relates to lawn mowers and law equipment. More specifically, the present invention pertains to a new rear discharge lawn mower having a discharge housing area and protection for the lawn mower drive elements and tire sidewalls. The present invention contemplates a new pathway and rear shield for a rear discharge mower, wherein clippings are ejected from the rear of the mower deck for mulching purposes and to place outgoing debris along a pathway already traveled by the mower.

Ride-on lawn mowers and tractors are well described devices in the prior art and are well known for cutting a large swath of grass with each pass of the mower. These devices are known to have a mower deck comprising at least one rotating shaft connected to an extended grass-cutting blade, wherein the blade rotates within the housing to trim a quantity of grass passing through the housing. Grass clippings are created by the action of the blade and directed from the mower deck into a receptacle for collection or freely spread across the lawn for mulching and fertilization purposes. The discharge area from the mower is commonly along the side of the mower deck or along the rear of the deck and through a conduit routed between the rear wheels, wherein the conduit connects to a collection bag or terminates to spread the clippings across the lawn. These rear discharge mowers are also described in the art, and generally relate to those with a simple opening along the rear of the deck, or further a conduit for routing the exiting clippings.

Routing the discharged clippings through the rear of the vehicle and between the wheels can be problematic and design sensitive, as the drive mechanisms for the rear wheels, along with the wheels themselves, are readily exposed and consume a volume required for placement of a grass clipping conduit. Alternatively and in place of a clipping conduit, simply allowing clippings to exit the rear of the mower deck is another common solution; however this method is also problematic, as the grass clippings, dirt and flying debris can easily clog or damage the moving elements of the drive mechanism, and further create a puncture risk for the inner sidewalls of the rear tires if a larger or heavier object is caught by the spinning blades and ejected from the rear of the mower deck.

The present invention relates to a ride-on lawn mower or tractor rear discharge system that combines both systems, namely a large open area for the discharge of clippings and further a means to control and contain the discharge such that the drive mechanisms and rear wheels of the mower are not harmed or endangered. The present invention provides a rear discharge mower deck that routes clippings between the rear wheels of the mower and into a structure comprising an upper enclosure that shrouds the drive mechanisms of the mower and connects to the mower frame, along with downwardly suspended tire shields that shroud the inner sidewalls of each tire. The tire shields, combined with the lower shield surface of the upper enclosure, form an expanding tunnel or conduit through which the clippings are routed and discharged from the rear of the mower for mulching purposes. Objects such as rocks, large branches or broken glass is further routed through the rear of the mower and onto a location that has already been traveled by the mower, reducing the likelihood the mower will reengage these items more than once.

2. Description of the Prior Art

Devices have been disclosed in the prior art that relate to rear discharge and mulching mowers. These include devices that have been patented and published in patent application publications. These devices generally relate to rear discharge mowers having a freely open rear portion or a conduit for routing outwardly flowing clippings and material therethrough. The devices deemed most relevant to the present disclosure are herein described for the purposes of highlighting and differentiating the unique aspects of the present invention, and further highlighting the drawbacks existing in the prior art.

Specifically, U.S. Pat. No. 6,470,663 to Langworthy discloses a rotary cutting deck having a rear grass discharge outlet formed by a cut-away portion of the device peripheral wall along the rear quadrant. A grass deflecting ramp deflects grass clippings downwardly towards the rear discharge outlet, while a horizontal baffle can be provided along the lower edge of the peripheral wall in advance of the rear grass discharge outlet to minimize side streaking of clippings. While providing a unique mower frame having a peripheral edge and rear discharge, the Langworthy device fails to disclose a cutting deck that incorporates features that are well suited to protect a tractor or ride-on lawn mower rear portion as grass clippings are discharged. Rather, the Langworthy device relates primarily to the design and operation of the mower deck, as opposed to an assembly rear of the discharge area.

Another such device is U.S. Pat. No. 6,474,054 to Schaedler, which discloses a rear discharge mower having a frame, drive wheel having a drive axle and a mower deck supported by the frame. The mower includes a rear discharge chute and a grass clipping bag, along with a transmission to drive the drive wheel in proximity to the rear chute and clippings bag. The device and arrangement of the Schaedler device provides a large cross sectional area for the rear chute while accommodating the drive means and transmission in line therewith. The present invention provides clearance for the axle of the tractor rear wheel, while also maximizing the area for rear discharge of clippings, however the structure and arrangement of the present invention differs from the Schaedler device.

Further, U.S. Pat. No. 6,431,305 to Ishimori discloses a rear discharge mower unit having a mower housing defining a flow path for grass clippings and a power transmission and axle assembly adjacent to and accommodating the rear discharge flow path. The device further comprises a grass catcher mounted to the rear region of the tractor for trapping and collecting cut grass flowing from the rear mounted duct carrying the clippings. While similar in spirit to the present invention, the Ishimori device contemplates a duct that routes clippings around the rear axle and transmission elements of the tractor, while the present invention provides no rear collection bag and provides shrouds for the transmission element and the inner sidewalls of the tire. The present invention includes shrouds that allow clippings to be mulched and sent through the rear of the assembly, while the moving elements of the tractor and the tires are protected from projected debris, such as rocks, sticks and broken glass that may be ejected from the rear discharge mower deck.

A second Ishimori device, U.S. Pat. No. 6,038,840, discloses a novel rear discharge mower deck, which cuts grass using a plurality of rotating mower blades and routes the clipping out of a rear outlet. A plurality of baffles are positioned to route clippings along an efficient path that allows ready discharge, while a grass clippings transport duct routes the discharged clippings through a conduit out of the back of the mower vehicle. The duct, while routing clippings, differs in design and intent from the present invention, which contemplates a rear shrouded housing wherein clippings are freely discharged while components of the mower are protected from flying debris. The housing shrouds the drive mechanisms of the rear axle and further comprises downward tires shields. The housing is accessible to provide access for mechanics and users to service the rear drive mechanisms within the housing.

Finally, U.S. Pat. No. 5,267,429 to Kettler discloses another rear discharge mower mechanism, wherein a mower blade housing includes a plurality of mower blades for cutting vegetation, a rear housing opening through which the cut vegetation exits the housing, along with a plurality of baffles that facilitate the movement of the clippings within the housing and passage through the rear opening as the blades rotate. The baffles channel the clippings rearward and comprise a first and second deflecting surface, along with a third, horizontal surface therebetween to prevent clippings from accumulating under the baffles while in operation. The Kettler device is directed to a specific design for a rear discharge mower, and does not include a passage means rearward of the mower housing. The present invention relates to a rear discharge mower having a mower deck and a rear housing that channels clippings while shrouding the working elements of the mower, including the rear drive elements and the tire sidewall portions.

The present invention combines the current methods of rear discharge mowers by providing both an open pathway that shrouds the rear of the mower, while also providing a defined conduit for the clippings to be communicated from the mower deck. The rear enclosure of the present invention shrouds the drive mechanisms of the mower and provides ease of access for maintenance thereof while remaining installed. Further, attached tire shields prevent damage to the sidewalls of the rear tires while in operation, deflecting debris, rocks and heavier or harder objects from contacting the tire surface after discharge from the mower deck. It is submitted that the present invention substantially diverges in design elements from the prior art, and consequently it is clear that there is a need in the art for an improvement to existing rear discharge mower devices. In this regard the instant invention substantially fulfills these needs.

SUMMARY OF THE INVENTION

In view of the foregoing disadvantages inherent in the known types of rear discharge mowers now present in the prior art, the present invention provides a new mower device and clippings conduit, wherein the same can be utilized for providing convenience for the user when guiding clippings and debris from the rear of a mower deck, shrouding sensitive portions of the mower and allowing the clipping to freely distribute for lawn mulching purposes.

It is therefore an object of the present invention to provide a new and improved rear discharge mower device that has all of the advantages of the prior art and none of the disadvantages.

It is another object of the present invention to provide a rear discharge mower that combines a means of routing clippings from the rear of a mower deck with a shroud means for sensitive portions along the rear of the mower.

Another object of the present invention to provide a rear discharge mower that provides an enclosure for the drive elements of the mower, while allowing ready access thereto for maintenance and inspection purposes.

Another object of the present invention to provide a rear discharge mower that provides a three-sided shroud comprising a pair of downwardly supported tire shields and a roof shield that provides an open pathway for discharged clippings from the mower deck and through the rear of the mower.

Still another object of the present invention is to provide a rear discharge mower that provides a means to route hazardous or overly large debris sources, such as stones, branches and broken glass through the rear of the mower and onto a surface that the mower has already traveled, reducing the likelihood of the mower running over these items a second time or endangering the front tires with the debris.

Yet another object of the present invention is to provide a rear discharge mower assembly that is adaptable to many designs and styles of rear discharge mowers, wherein space is provided and structural frame attachments are available for an enclosure having supported shield elements attached thereto.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
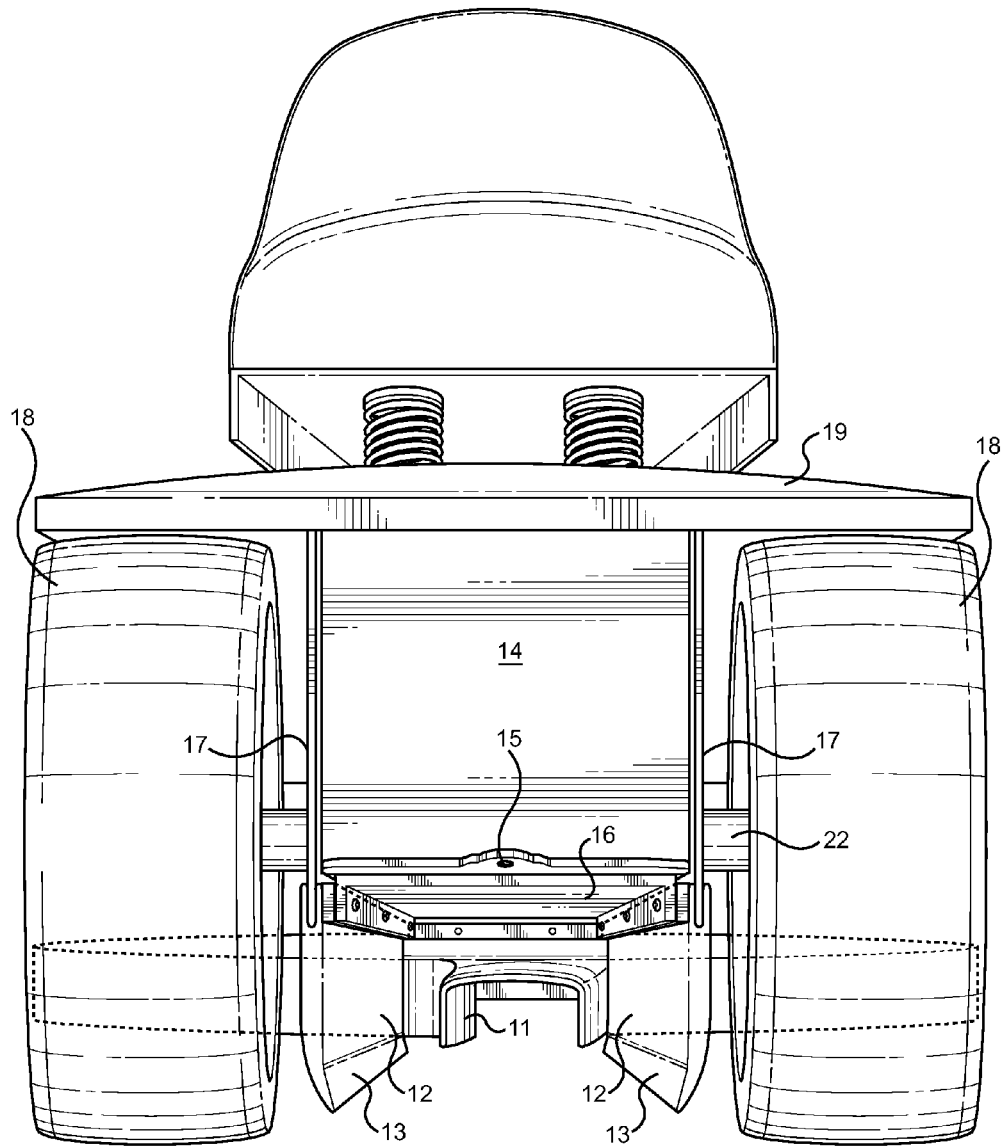
FIG. 1 shows a rear perspective view of the present rear discharge mower and assembly in a working position.

Reference is made herein to the attached drawings. Like reference numerals are used throughout the drawings to depict like or similar elements of the rear discharge mower. For the purposes of presenting a brief and clear description of the present invention, the preferred embodiment will be discussed as used for providing an open pathway for clippings through the rear of a mower while shrouding sensitive areas of the mower itself. The figures are intended for representative purposes only and should not be considered to be limiting in any respect.

Referring now to FIG. 1, there is shown a rear perspective view of the rear discharge mower and rear assembly of the present invention. The device comprises a rear enclosure having a hinged back plate 14, a lower shield surface 16, a pair of side panels 17 and a forward panel forming a largely rectangular structure adapted to surround and shroud the rotating drive elements of the lawn mower. A first and second axle penetration provides through-access for the rear axle 22 of the mower, while the transmission, drive shaft and other rotary drive mechanisms are contained within the enclosure and protected from debris and airborne clippings. The upper portion of the enclosure attaches to the rear frame 19 of the mower, between the rear tires 18 and above the pathway of the mower deck rear discharge chute 11. The hinged back plate incorporates a handle 15 for accessing the interior of the enclosure and thus providing access to the drive mechanisms housed therein for maintenance or inspection. Attached to the hinged back plate 14 and extend from the enclosure is an extendable brace that maintains the open position of the back plate 14 when opened for inspection of the mower assembly. This brace is a securable structure that supports the back plate 14 in an upright position and is collapsible or disengageable therefrom when closing the back plate 14.

Mounted below the enclosure is a first and second downwardly supported tire shield 12 that extend rearwardly from the mower deck chute 11 to the rear extent of the tires 18. The tire shields 12 connect along their upper edge and form shields that deflect clippings and airborne debris through the rear of the mower, preventing the tire sidewalls from being contacted or otherwise impacted. The shields 12 are stiffened panels that do not readily deflect, while their lower edge 13 comprises a flexible or elastic portion that adjusts for an inconsistent ground surface. The upper portion of the shields 12 preferably connects to the sidewalls 17 or lower shield surface 16 of the rear enclosure, wherein the lower shield surface 16 and the two tire shields 12 form an open pathway that routes clippings from the mower discharge chute 11 past the drive elements and rear tires of the mower without exposure thereof. These elements form a conduit, wherein the tire shields 12 may be aligned with the longitudinal axis of the mower, or flare outward to progressively increase the linear area of the conduit moving rearward.

Figure 2:
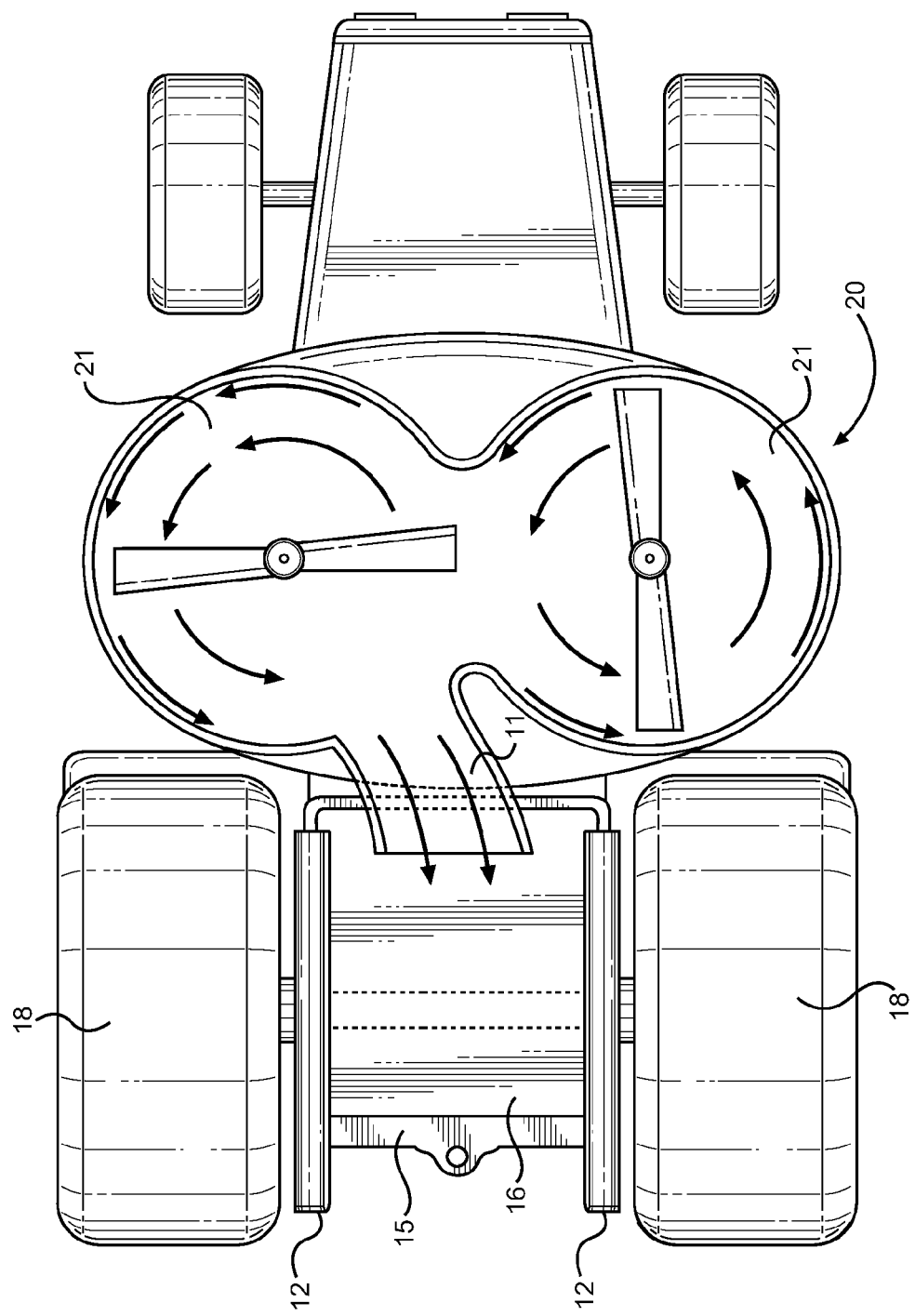
FIG. 2 shows an underside view of the present rear discharge mower deck and assembly.

Referring now to FIG. 2, there is shown an underside view of the rear discharge mower of the present invention, wherein the underside of the rear discharge mower deck 20 is visualized along with the pathway for clippings through the rear of the mower. The mower deck 20 comprises an enclosure having an open lower portion and interior volume 21 that houses at least one rotating mower blade. The mower blades trim a patch of grass as it feeds into the mower deck 20, whereafter the grass clippings are routed through the rear of the deck via a rear chute 11 and induced air flow from the rotating blades. The design of the mower deck 20 may take several forms, however it is desired to disclose a novel combination of elements that form a protected pathway for which to route rearwardly distributed grass clippings from a mower deck assembly. The mower deck is one that is adapted to route and readily discharge clippings through a rear chute 11 and through the shielded portions along the rear. Once discharged, the tire shields 12 and lower shield surface 16 of the enclosure provides a pathway that protects the tires 18 and drive mechanisms of the mower while in operation. The clippings are sent through this pathway and distributed onto the lawn surface, whereafter they provide a mulch that fertilizes the lawn, accelerating growth and promoting a healthy lawn.

Figure 3:
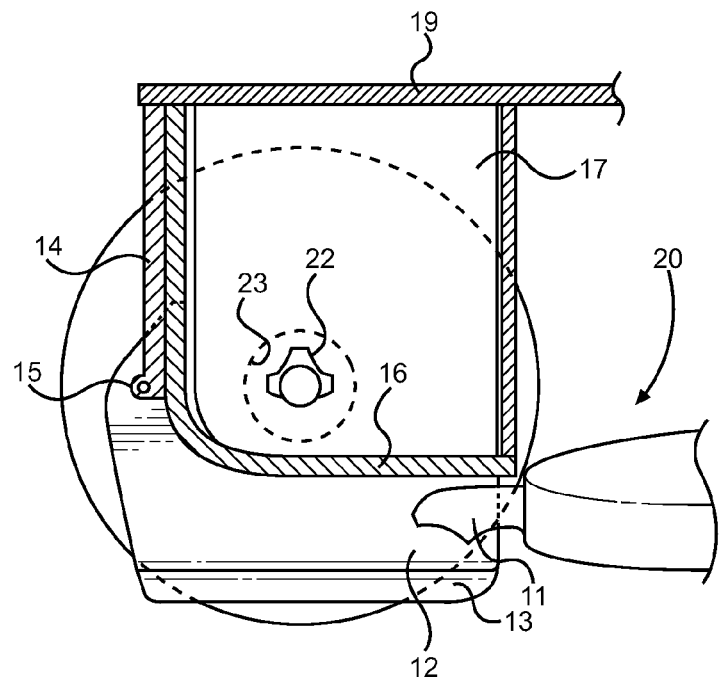
FIG. 3 shows a cross section side view of the present invention rear assembly.

Referring now to FIG. 3, there is shown cross section view illustrating the construction of the rear enclosure, its connection to the mower frame 19 and the extents of the tire shields 12 with respect to the rear tires. Clippings are discharged from the mower deck 20 via the rear chute 11, whereafter they are contained and routed between the lower shield surface 16 of the enclosure and the opposing tire shields 12 extending downwardly from the enclosure to the ground surface. Uneven terrain, rocks or changes in pitch place the tire shields 12 in contact with the ground surface, therefore their lower extents are comprised of a readily flexible material or attachable extensions, which operation as mud flaps or deflectable extensions that absorb impact without transferring load into the shields 12, the enclosure or the mower frame. The rear chute 11 may further comprise a flexible or rubberized flap that further prevents larger or heavier debris from flying directly from the mower deck 20 and into the rear enclosure.

Figure 4:
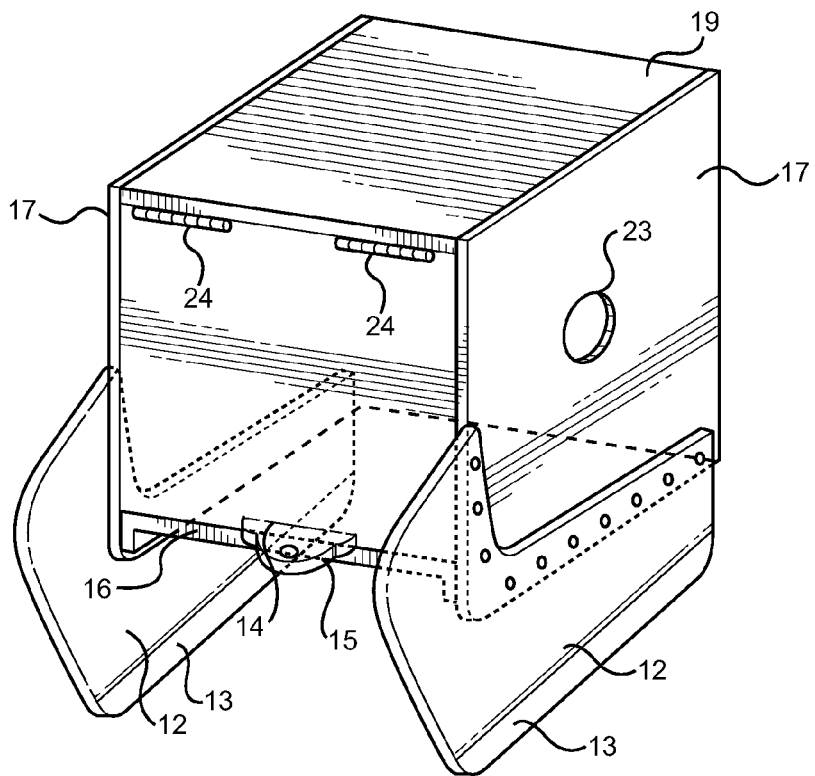
FIG. 4 shows a perspective view of the present invention rear assembly.

Further visualized in FIG. 3 and also shown in FIG. 4 are the rear axle penetrations 23 along the enclosure side panels 17. This penetration comprises an open aperture that allows the axle to be routed therethrough without interference. The aperture may be large enough to prevent interference and account for movement of the axle or drivetrain elements within the enclosure. Referring now to FIG. 5, the hinges 24 of the rear panel are visualized, which allow the panel to be rotated outward via the attached handle 15, providing the user with ready access to the drivetrain or axle of the mower if desired. To accommodate the design of different mowers and their diverse drivetrain elements, the panels of the enclosure may be shaped to avoid interferences and include a plurality of apertures or open spaces. It is required to provide a continuous lower shield surface 16 that connects to the first and second downwardly attached tire shields 12 of the present invention. These elements combine to form the debris pathway of from the mower deck, while the enclosure may take several forms and adapt to the specific design of the mower and provide shrouded protection of the mower drive elements.

In light of the present disclosure, it is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rear discharge lawn mower assembly attachable to a rear discharge mower, comprising:
    a rear discharge mower deck having a rear chute for expelling clippings between a first and second rear mower tire and beneath rear drivetrain elements of said mower including a rear axle;
    a rear enclosure formed of a back plate, a pair of side panels, a forward panel and a lower shield surface, wherein said rear chute is positioned below said lower shield surface;
    said rear enclosure attaching to a frame of said mower and forming a housing around said rear drivetrain elements and substantially accepting said rear axle of said mower therethrough;
    a first and second tire shield downwardly supported from said pair of side panels of said rear enclosure to a ground surface for protecting inner sidewalls of said first and second rear mower tires, said first and second tire shields extending from a position immediately adjacent said rear chute to rear extents of said first and second mower tires;

said lower shield surface and said first and second tire shields forming a pathway from said rear chute to said rear extents of said first and second rear mower tires for routing grass clippings therethrough.

2. The device of claim 1, wherein said back plate of said rear enclosure further comprises a hinged connection to allow access within an interior of said rear enclosure.

3. The device of claim 1, wherein lower extents of said first and second tire shield further comprise a flexible material to absorb impact with said ground surface.

4. The device of claim 1, wherein said first and second tire shield are aligned with a longitudinal axis of said mower.

5. The device of claim 1, wherein said rear enclosure forms a largely rectangular structure with an interior volume.

* * * * *